United States Patent [19]

Hooijmans et al.

[11] Patent Number: 5,140,277
[45] Date of Patent: Aug. 18, 1992

[54] POLARIZATION-INDEPENDENT RECEIVER

[75] Inventors: Pieter W. Hooijmans; Markus T. Tomesen, both of Eindhoven, Netherlands

[73] Assignee: U.S. Philips Corporation, New York, N.Y.

[21] Appl. No.: 752,715

[22] Filed: Aug. 30, 1991

[30] Foreign Application Priority Data

Sep. 4, 1990 [NL] Netherlands .................. 9001938

[51] Int. Cl.[5] .................. H03D 3/00; H03D 9/04; H04B 10/14
[52] U.S. Cl. ............................ 329/302; 359/192
[58] Field of Search .............. 329/300, 301, 302, 315, 329/318, 319, 320, 321, 322, 323, 325, 326, 327, 340, 347, 349, 350, 351, 353, 354, 360, 363, 364, 365, 366, 370; 359/192

[56] References Cited

U.S. PATENT DOCUMENTS

| | | | |
|---|---|---|---|
| 3,867,707 | 2/1975 | Pering et al. | 455/214 X |
| 4,110,700 | 8/1978 | Rosen et al. | 455/214 X |
| 4,577,157 | 3/1986 | Reed | 329/360 X |
| 4,972,515 | 11/1990 | Shibutani | 359/192 |

OTHER PUBLICATIONS

B. Enning et al., "Signal Processing in an Optical Polarization Diversity Receiver for 560-Mbit/s ASK Heterodyne Detection", Journal of Lightwave Technology, vol. 7, No. 3, Mar. 1989, pp. 459-464.
R. Modafferi, "A New Low Distortion FM Tuner", IEEE Transaction on Broadcast and Television Receivers, vol. BTR-16, No. 4, Nov. 1970, pp. 343-351.
Shibutani et al, "A Study on an Active Square-Law Combining Method for a Polarization-Diversity Coherent Optical Receiver", IEEE Photonics Technology Letters, vol. 1, #7, (Jul. 1989), pp. 182-183.

Primary Examiner—David Mis
Attorney, Agent, or Firm—Anne E. Barschall

[57] ABSTRACT

For obtaining an output signal which is independent of the polarization direction of the received signal in a receiver for polarized electromagnetic signals, the received signal is split up into two components having a mutually orthogonal polarization direction before these signals are converted to an intermediate frequency. For combining, subsequent to demodulation, the two intermediate-frequency signals to a baseband signal which is independent of the polarization direction, a demodulator is used having a quadratic relation between input and output signals. For obtaining this quadratic relation, the intermediate-frequency signal is split up by an amplifier 20 into two signals having a mutually identical amplitude and mutually opposite signs. Consequently, the odd order terms in the sum of the currents through the diodes 27 and 28 will have opposite signs relative to the odd order terms in the sum of the currents through the diodes 36 and 37. By determining the sum of the currents through all four diodes, the odd order terms will cancel each other out so that only the even order terms of which the quadratic term is the most important will remain so that the desired quadratic relation is obtained.

13 Claims, 4 Drawing Sheets

POLARIZATION-INDEPENDENT RECEIVER

The invention relates to a receiver for polarization-diversity reception with a square-law recombining of baseband signals comprising two intermediate-frequency branches formed each by a demodulator having an input.

Such a receiver is described in the article entitled "A Study on an Active Square-Law Combining Method for a Polarization-Diversity Coherent Optical Receiver", published in IEEE Photonics Technology Letters, Vol. 1, No. 7, July 1989.

For transporting a baseband signal through a glass fibre, in coherent optical transmission systems the light signal coming from a transmitting laser can be amplitude, frequency or phase-modulated by the baseband signal before the light signal is fed to the glass fibre.

For demodulating the light signals at the receiver end with the aid of current electronic components, it is necessary to convert the light signal having a very high frequency (for example, $10^{14}$ Hz) to a signal having a much lower intermediate frequency of, for example, $10^9$ Hz. In the receiver, with the aid of an optical directive coupling and a photodiode, the received light signal is thereto mixed with a light signal locally generated by means of a laser. This produces an intermediate-frequency signal having a frequency equal to the differential frequency between the frequency of the received light signal and that of the locally generated light signal.

In order to let this mixing be accompanied by the least possible signal loss, it is necessary that the polarization direction of the received light signal and that of the locally generated light signal be equal. Generally, the polarization direction of the received light signal, however, is unspecified and, furthermore, not constant with time. Without any precautionary measures, the amplitude of the intermediate-frequency signal may vary between a maximum value (when the two polarization directions are identical) and substantially zero (when the two polarization directions are orthogonal).

This problem is generally solved by splitting up the received light signal into two components having a mutually orthogonal polarization direction. Each signal component is individually mixed with a correspondingly polarized component of the locally generated light signal. This mixing produces two intermediate-frequency signals. Subsequent to amplification and demodulation of the intermediate-frequency signals two baseband signals are available whose amplitudes are proportional to the amplitudes of the two mutually orthogonal polarized components of the received light signal.

For obtaining a baseband signal whose amplitude is proportional to the amplitude of the received light signal and independent of the polarization direction thereof, in accordance with known properties of vectors, the two baseband signals are to be squared and then added together. Instead of squaring the obtained baseband signals, the desired output signal may also be obtained by using a demodulator in which the amplitude of the input signal and the amplitude of the output signal have a quadratic relation.

In the prior-art receiver the squaring is performed by means of a double-balanced mixer as described in aforementioned article from IEEE Photonics Technology Letters. A disadvantage of the double-balanced mixer described there is, that there is an accurate square-law transmission in only a small range of the amplitude of the input signal. Consequently, the baseband signal will not be squared accurately for all available signal levels, so that the amplitude of the baseband signal will not be independent of the polarization direction of the received light signal. In order to have an accurate squaring of the baseband signals after all, the double-balanced mixer in the prior-art receiver is preceded by an amplifier which has an automatically controllable gain factor, this gain factor being adjusted by a control circuit so that the output signal of the amplifier is equal to the value at which there is optimum accuracy square-law transmission from the double-balanced mixer.

Because the total gain factors in the two intermediate-frequency branches are to remain the same, mutually, the double-balanced mixer is to be followed by a second amplifier with adjustable gain factor which can be adjusted in such a way that the gain factor has an identical value for the two intermediate-frequency branches from the input of the first amplifier to the output of the second amplifier. Thus, the prior-art receiver necessitates four amplifiers (two for each intermediate-frequency branch) having adjustable gain factors. In addition, the gain factors of these amplifiers are related in a rather complex manner. In order to maintain the overall gain factor constant from the input of the first amplifier to the output of the second amplifier, the presence of a square-law element between the first and second amplifiers requires that the gain factor of the second amplifier be proportional to the square root of the gain factor of the first amplifier.

It is an object of the invention to provide a receiver of the type mentioned in the preamble for which not more than two controllable amplifiers are necessary and, in addition, whose gain factors are identical.

For this purpose, the receiver according to the invention is characterized in that each demodulator comprises a balanced circuit having first and second outputs with equal-amplitude and different-sign output signals which output signals are derived from the input signal of the demodulator concerned, in that each demodulator comprises at least first and second non-linear elements which have an input and an output and a mutually equal relation between input signal and output signal, in that the first output of each balanced circuit is connected to the input of the associated first non-linear element, in that the second output of each balanced circuit is connected to the associated second non-linear element and in that the receiver comprises summing means for determining the sum of the output signals of the non-linear elements in the two demodulators.

The invention is based on the recognition that it is possible to have only two controllable amplifiers if a demodulator is used, while there is an accurate square-law relation between the amplitude of the demodulator input signal and the demodulator output signal over a sufficiently large range of the demodulator input signal. Hereinbelow there will be shown that the described measures really lead to the desired square-law relation. It is assumed in this context that the gain factors from the output of the photodetectors to the inputs of the demodulators are mutually identical in the two branches.

If it is assumed that the amplitude of the intermediate-frequency signal on the first output of the balanced circuit is equal to $+E$, the amplitude of the intermediate-frequency signal on the second output of the balanced circuit will be equal to $-E$. For the signal $E_p$ on the output of the first non-linear element it holds:

$$E_p = aE + bE^2 + cE^3 + dE^4 + \ldots \quad (1)$$

The coefficients a, b, c, d are determined by the properties of the non-linear element. For the signal $E_n$ on the output of the second non-linear element it holds:

$$E_n = -aE + bE^2 - cE^3 + dE^4 + \ldots \quad (2)$$

For the sum $E_t$ of the output signals $E_p$ and $E_n$ of both non-linear elements it holds:

$$E_t = 2bE^2 + 2dE^4 + \ldots \quad (3)$$

From (3) it appears that now only the even order terms remain. Due to the absence of the first and third order terms the desired accurate square-law relation is obtained if also the fourth order term is restricted by not choosing too large a value for the amplitude of the input signal E.

As a result of the obtained well-approximated square-law transmission of the demodulator, the intermediate-frequency signal supplied thereto will be rectified so that a demodulated baseband signal is obtained having an amplitude which is proportional to the square of the amplitude of the intermediate-frequency signal. If the transmission of the balanced circuit over a specific bandwidth is independent of frequency, the demodulator can be used for demodulating amplitude-modulated signals. Alternatively, it is possible to make the transmission of the balanced circuit frequency-dependent; with a suitable selection of the transmission characteristic, the magnitude of the obtained baseband signal is dependent on the frequency of the applied intermediate-frequency signal so that the demodulator is then suitable for demodulating frequency-modulated signals.

An embodiment of the receiver according to the invention suitable for frequency modulation is characterized in that the output signals of the first and second outputs of each balanced circuit are derived from the input signal of the demodulator concerned with the aid of a low-pass filter, in that each balanced circuit has third and fourth outputs with equal-amplitude and different-sign output signals which output signals are derived from the output signal of the demodulator concerned with the aid of a high-pass filter, in that each demodulator comprises third and fourth non-linear elements having an input and an output and a mutually identical relation between input signal and output signal, in that the third output of each balanced circuit is connected to the input of the associated third non-linear element, in that the fourth output of each balanced circuit is connected to the input of the associated fourth non-linear element and in that the sign of the output signal of each first and second non-linear element differs from the signs of the output signals of the associated third and fourth non-linear elements and in that the output of each third and fourth non-linear element are connected to the summing means.

Because the transmission of the balanced circuit is frequency-dependent, a frequency demodulator is obtained having a quadratic relation between the amplitude of the input signal and the amplitude of the output signal. Additionally, the measures taken advantageously make it possible to obtain a frequency error signal which is a measure for the mean frequency deviation of the intermediate-frequency signal from a reference frequency, which reference frequency is determined by the properties of the low and high-pass filters. In order to ensure that the intermediate-frequency signal fits in the available bandwidth of the two intermediate-frequency branches, the obtained frequency error signal may be used for adjusting the frequency of the locally generated light signal in such a way that the mean frequency of the intermediate-frequency signal becomes equal to the reference frequency.

If the mean frequency of the intermediate-frequency signal is equal to the reference frequency, the mean amplitude of the output signals of the first and second outputs of the balanced circuit (which were mutually identical already) is equal to the mean amplitude of the output signals of the third and fourth outputs of the balanced circuit (which output signals were also mutually identical already). As a result, the mean value of the output signal of the associated non-linear elements is equally large. Because the output signals of the first and second non-linear elements have different signs relative to the output signals of the third and fourth non-linear elements, the mean value of the output signal of the summing means is equal to 0. With a mean frequency larger or smaller than the reference frequency, the mean amplitude of the output signals of the first and second outputs of the balanced circuit will be greater or smaller respectively, than the mean amplitude of the output signals of the third and fourth outputs of the balanced circuit and the mean value of the output signal of the summing means will be positive in one case and negative in the other. The mean value of the signal which signal is a measure for the frequency deviation may simply be determined by means of a low-pass filter.

A preferred embodiment of the receiver is characterized in that the low-pass filter and the high-pass filter comprise an open or a short-circuited transmission line.

By structuring the filters in the form of open or short-circuited transmission lines, prior-art properties of transmission lines may make it possible to relatively simply realise high and low-pass filters having a high cut-off frequency, so that the receiver is rendered suitable for wide-band signals.

A further embodiment of the receiver is characterized in that the input signals of the non-linear elements are formed by the voltage across the non-linear elements and in that the output signals of the non-linear elements are formed by the current through the non-linear elements.

The advantage of this embodiment is that the output signals may now be added together by simply interconnecting the outputs and converting the overall current thus obtained into an output voltage, for example, by means of a current-to-voltage converter. In this respect there should preferably be provided that the noise addition of the current-to-voltage converter is lower than the noise addition of the non-linear elements. However, alternatively, it is conceivable that the output currents of the non-linear elements are first amplified before being added together.

A preferred embodiment of the receiver is characterized in that the receiver comprises a current source connected on one side to a first side of a first reference element, in that the second side of the first reference element is connected to a first side of a second reference element and in that a second side of the second reference element is connected to the second side of the current source, in that the receiver comprises separate coupling means for each first and second non-linear element which coupling means are used for transferring the DC voltage from the first side of the first reference element to the input of each first non-linear element and to the input of each second non-linear element, in that the receiver comprises separate coupling means for each third and fourth non-linear element which coupling means are used for transferring the DC voltage from the second side of the second reference element to the input of each third non-linear element and to the input of each fourth non-linear element and in that the receiver comprises separate coupling means for transferring the DC voltage from the second side of the first reference element to the inputs of the summing means.

The quiescent voltage across the non-linear elements is entirely determined in this embodiment by the voltage across the reference elements and because the non-linear elements rectify the intermediate-frequency signal, no additional voltage will occur across the non-linear elements. The occurrence of an additional DC voltage across the non-linear elements is undesirable as this causes the coefficients of the Taylor series which describes the behaviour of the non-linear elements to change values. As a result, the transmission of the intermediate-frequency branch concerned becomes signal-dependent, leading to the fact that the mutual equality of the signal transmission in the two intermediate-frequency branches is no longer guaranteed as a result of the signal amplitudes which may mutually differ in the two intermediate-frequency branches.

Since the problem of receiving electromagnetic signals with an undefined polarization direction not only occurs in transmission of optical signals through glass fibres, but also with different sorts of transmission of electromagnetic signals, such as, for example, in microwave communication, and the measures according to the invention may also be applied in that field, the scope of the invention is not restricted to the field of glass fibre communication but also includes different types of transmission of electromagnetic signals.

The invention will now be further explained with reference to the drawing Figures in which identical elements are denoted by identical reference characters, in which.

Figure 1:
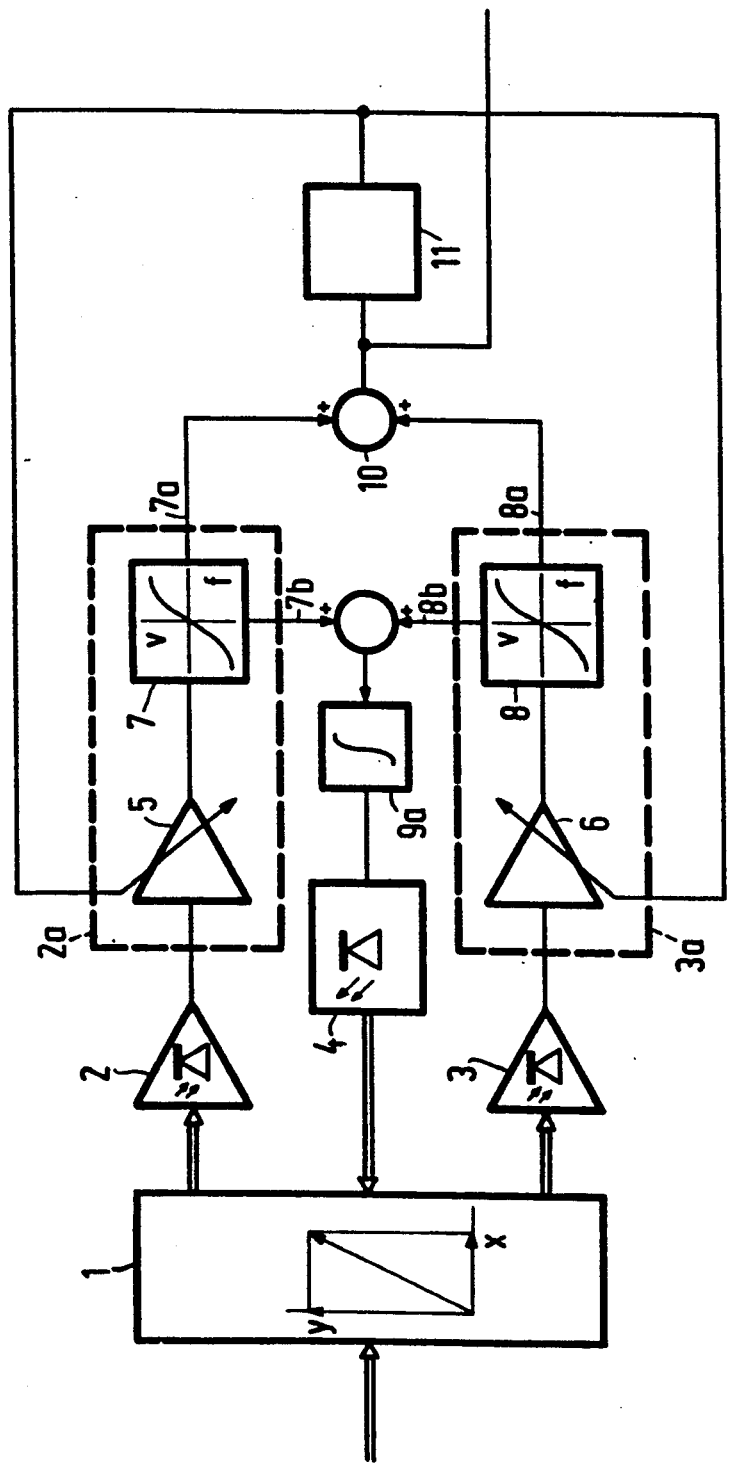
FIG. 1 shows a block diagram of a receiver according to the invention, suitable for receiving frequency-modulated signals.

In FIG. 1 the received signal consisting of polarized light having an unknown plane of polarization is applied to a polarization beam splitter 1. This beam splitter is also supplied with the light signal generated by a laser diode 4 to obtain output signals which are a sum of a component of the received light signal and the locally generated light signal. The two optical output signals of the polarization beam splitter 1 are applied to two photodetectors 2 and 3.

The output of the photodetector 2 is connected to the input of a first intermediate-frequency branch 2a, which input is formed by the input of an amplifier 5 having a gain factor which can be adjusted by means of a control signal. The output of the amplifier 5 is connected to the input of a frequency demodulator 7 which has a baseband output 7a and a frequency error output 7b. The baseband output 7a of the demodulator 7 is connected to an input of an adder circuit 10 which adder circuit forms part of the summing means. The frequency error output 7b of the demodulator 7 is connected to an adder circuit 9.

The output of the photodetector 3 is connected to the input of a second intermediate-frequency branch 3a which input is formed by the input of amplifier 6 having a gain factor adjustable by means of a control signal. The output of the amplifier 6 is connected to the input of a frequency demodulator 8 which has a baseband output 8a and a frequency error output 8b. The baseband output 8a of the demodulator 8 is connected to an input of the adder circuit 10. The frequency error output 8b of the demodulator 8 is connected to an input of the adder circuit 9.

The baseband signal is available at the output of the adder circuit 10. The output of the adder circuit 10 is connected to the input of an integrating amplitude detector 11. The output of the amplitude detector 11 is connected to the control inputs of the amplifiers 5 and 6. The output of the adder circuit 9 is connected to an integrator 9a. The output of the integrator 9a is connected to a frequency control input of the laser diode 4.

In the polarization beam splitter 1 the received optical signal is added to the light signal generated by the laser diode 4. The sum signal thus obtained is then split into two components having a mutually orthogonal polarization direction, which components are available at the outputs of the polarization beam splitter 1. In order to obtain two equivalent output signals, the polarization directions of the two output signals relative to the polarization direction of the light signal generated by the laser diode 4 are selected so that each output signal receives half the light signal generated by the laser diode 4. The parts of the output signals of the polarization beam splitter 1 coming from the input signal will generally not be equal.

The two optical components of the sum signal are converted into an electric signal by the mutually identical photodetectors 2 and 3 which may be formed by photodiodes or phototransistors. Due to the non-linearity of the photodetectors 2 and 3 a signal having a frequency equal to the difference between the frequency of the received light signal and that of the light signal generated by laser diode 4 is available at the output of the photodetectors 2 and 3. The intermediate-frequency signals thus obtained at the outputs of the photodetectors 2 and 3 respectively, are amplified in mutually identical amplifiers 5 and 6 respectively. The output signal of amplifier 5 is demodulated by a frequency demodulator 7 having a quadratic relation between its input signal and its output signal, whereas the output signal of amplifier 6 is demodulated by a demodulator 8 which is equal to the demodulator 7.

By adding together the output signals of the demodulators 7 and 8 with the aid of the adder circuit 10, a baseband signal is obtained which is insensitive to the polarization direction of the received light signal.

For comparing the baseband signal with a decision threshold so as to determine a logic value of the baseband signal, the mean amplitude value of the baseband signal is fixed at a predetermined value. For this purpose, a control signal for the amplifiers 5 and 6 is derived in the amplitude detector 11 from the baseband signal so as to increase or reduce respectively, the gain factors of the amplifiers 5 and 6 when the amplitude of the baseband signal is too low or too high respectively. This control signal is obtained by rectifying the baseband signal, comparing the rectified signal with a reference value and integrating the resulting difference signal.

For obtaining a frequency error signal which is a measure for the means frequency deviation of the intermediate-frequency signal relative to a reference frequency, which error signal is insensitive to the polarization direction of the received light signal, the two frequency error signals 7b and 8b on the frequency error outputs of the demodulators 7 and 8 are added together by the adder circuit 9. The frequency error signal thus obtained is equal to 0 if the frequency difference between the mean frequency of the intermediate-frequency signal and a reference frequency is equal to 0. If the frequency difference is unequal to 0, the frequency error signal is positive or negative depending on the sign of the frequency signal.

For making the frequency difference equal to 0, the output signal of the adder circuit 9 is integrated with the aid of integrator 9a and thereafter applied to the laser diode 4 to adjust the frequency of the light signal generated by the laser diode 4 in the right direction.

Figure 2:
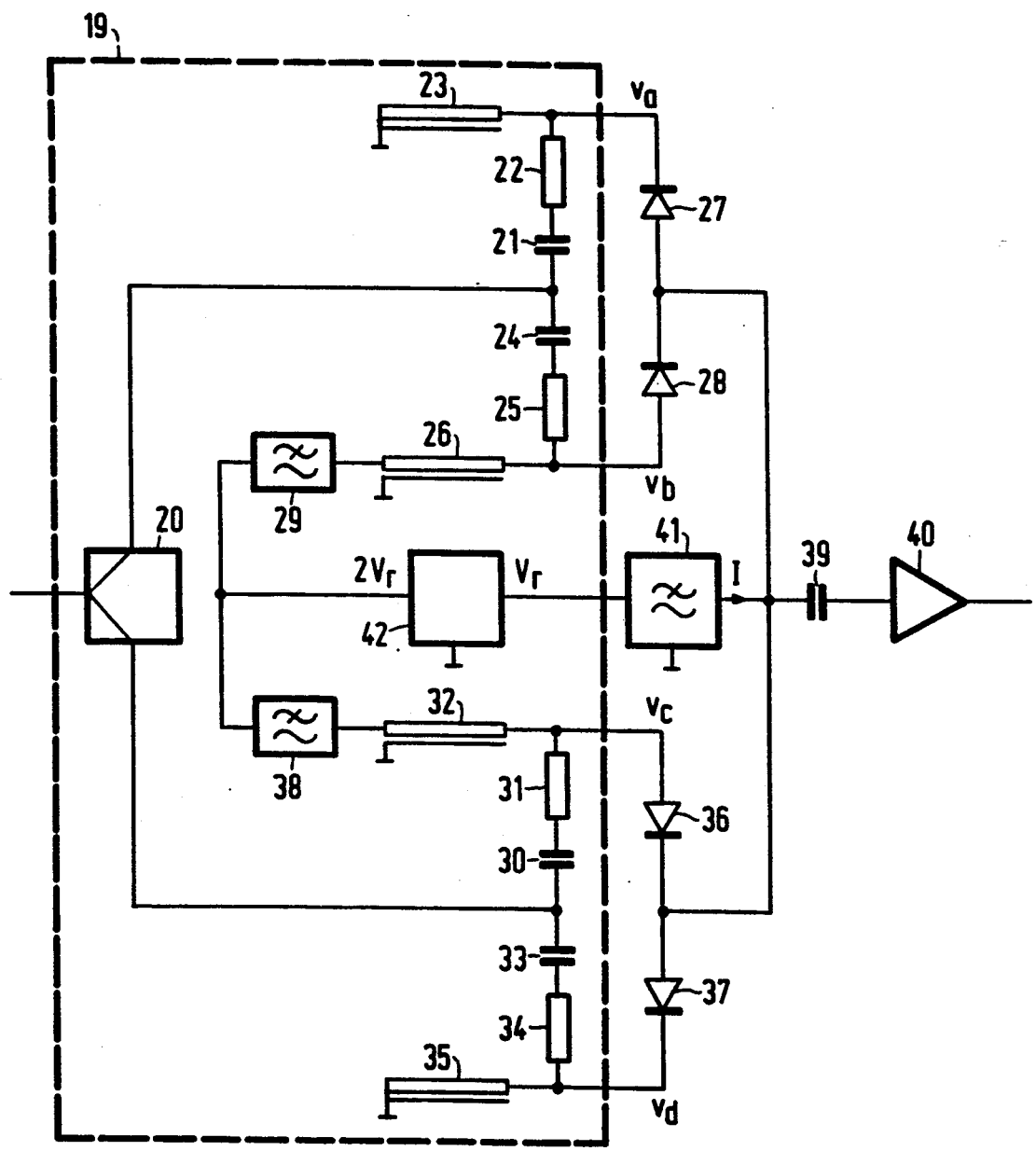
FIG. 2 shows a frequency demodulator to be used in a receiver as shown in FIG. 1.

In the frequency demodulator as shown in FIG. 2 the input signal is applied to the input of a balanced circuit 19, which input is formed by the input of a balanced amplifier 20 having two equal-amplitude and opposite-phase output signals. A first (second) output signal of amplifier 20 is applied to a first junction of two capacitors 21 (33) and 24 (30). The second side of the capacitor 21 (33) is connected to a first side of a resistor 22 (34). A second side of the resistor 22 (34) is connected to a first conductor of a short-circuited section of transmission line 23 (35), to be referenced stub hereinafter. The first conductor of short-circuited stub 23 (35) is also connected to the cathode of a diode 27 (37), which diode forms a third (fourth) non-linear element in accordance with the scope of the invention. The junction between the diode 27 (37), the resistor 22 (34) and the stub 23 (35) having output voltage $v_a$ ($v_d$) forms the third (fourth) output of the balanced circuit 19. A second conductor of the short-circuited stub 23 (35) is connected to a point of reference potential to be termed earth hereinafter.

The input to coupling means formed by a low-pass filter 29 (38) is connected to a reference potential 2 $V_r$, which reference potential originates from a reference circuit 42. The output of the low-pass filter 29 (38) is connected to a first conductor of an open stub 26 (32). The first conductor of the open stub 26 (32) is also connected to a first side of a resistor 25 (31) and to the anode of a diode 28 (36), this diode forming a first (second) non-linear element in accordance with the innovative idea. The junction between the diode 28 (36), the resistor 25 (31) and the stub 26 (32) having output voltage $v_b$ ($v_c$) forms the first (second) output of the balanced circuit. A second side of the resistor 25 (31) is connected to a second side of the capacitor 24 (30).

The anode of the diode 27, the cathode of the diode 28, the anode of the diode 37 and the cathode of the diode 36 are connected to a first side of a capacitor 39. The summing means are now formed by the connections between the diodes. A second side of the capacitor 39 is connected to the input of a current-to-voltage converter 40. The output of the current-to-voltage converter 40 forms the baseband output of the demodulator.

The input of a low-pass filter 41 is connected to a reference voltage $V_r$ generated in the reference circuit 42. The output of the low-pass filter 41 is connected to the first side of the capacitor 39. The low-pass filter 41 has an additional output at which a signal is available which is a measure for the DC current I supplied by the low-pass filter.

FIG. 2 shows that the supplied intermediate-frequency signal is amplified by amplifier 20 and split up into two signals having equal amplitude and opposite phases. A first (second) output signal of the amplifier 20 is applied through the capacitor 21 (33) to a voltage divider formed by the resistor 22 (34) and the short-circuited stub 23 (35) having output signal $v_a$ ($v_d$). The capacitor 21 (33) has a low impedance considering the frequency of the supplied intermediate-frequency signal and thus has no effect on the signal transmission.

Transmission line theory teaches that a short-circuited stub has a low input impedance for low-frequency signals and that this impedance increases for signals having a higher frequency. Due to this property of the short-circuited stub 23 (35) the voltage divider formed by the resistor 22 (34) and the short-circuited stub 23 (35) will form a high-pass filter.

The first (second) output signal of the amplifier 20 is also applied through a capacitor 24 (30) to a voltage divider formed by the resistor 25 (31) and the open stub 26 (32) having output signal $v_b$ ($v_c$). Due to its low impedance the capacitor 24 (30) does not have any effect on the signal transmission for intermediate-frequency signals. For the intermediate-frequency signals the output impedance of the low-pass filter 29 (38) is selected to be so high that this output impedance does not have any effect on the signal transmission.

Transmission line theory teaches that an open stub has a high input impedance for low-frequency signals and that this impedance decreases for signals having a higher frequency. Due to these properties of the open stub 26 (32) the voltage divider formed by the resistor 25 (31) and the open stub 26 (32) will form a low-pass filter.

The diode 27 (37) rectifies the signal $v_a$ ($v_d$) and diode 28 (36) the signal $v_b$ ($v_c$). Because the input impedance of the current-to-voltage converter 40 has a low value and also the capacitor 39 has a low impedance, the junction between the diodes 27, 28, 36 and 37 will continue to be at constant potential. The current through the diodes 27 and 28 now forms the output signal of these diodes. Because the cathode of the diode 27 is connected to the voltage $v_a$ and the anode of the diode 28 is connected to the voltage $v_b$, the currents the diodes 27 and 28 apply to the junction between these diodes will have different signs.

The sum of the currents applied by the diodes 27 and 28 to the junction between the diodes 27 and 28 will be positive for low frequencies because in that case the voltage $v_a$ is smaller than the voltage $v_b$. For high frequencies this sum is negative because the voltage $v_a$ exceeds $v_b$. If the frequency of the intermediate-frequency signal has a value so that the voltages $v_a$ and $v_b$ are equal, the sum of the currents produced by the diodes 27 and 28 will be equal to 0. In this manner an output current occurs which is a measurement for the frequency of the intermediate-frequency signal and which current is equal to 0 for a specific reference frequency.

The second output signal of the amplifier 20 is converted in a similar above-described manner into a frequency-dependent current available at the junction between the diodes 36 and 37.

Because the first and second output signals of the amplifier 20 have opposite phases, according to the fundamental concept of the invention the odd order terms in the Taylor series of the output currents of the diodes 27 and 28 and 36 and 37 respectively, caused by the non-linearity of the diode will also have opposite phases so that these terms cancel each other out in the sum of the currents in the four diodes. Consequently, only the even order terms will remain of which the quadratic term is the most important, so that a quadratic relation between the amplitude of the input signal of the demodulator at the output signal of the demodulator will be obtained. The sum of the output currents of the four diodes is converted by the current-to-voltage converter 40 into an output voltage which likewise forms the output signal of the demodulator.

The total DC current applied by the diodes 27, 28, 36 and 37 to their junctions, is a measurement for the mean frequency deviation of the intermediate-frequency signal relative to a reference frequency. This DC current is adopted by the output of the low-pass filter 41. The frequency error output of the demodulator is formed by an additional output of the low-pass filter 41 at which a signal is available which is proportional to the DC current I.

The anodes of the diodes 28 and 36 are supplied with a quiescent voltage 2 $V_r$ through low-pass filters 29 and 38. The junction between the diodes 27, 28, 36 and 37 are maintained at a quiescent voltage $V_r$ through the low-pass filter 41, whereas the cathodes of the diodes 27 and 28 are connected to earth over the short-circuited stubs 23 and 35. Consequently, the DC voltage across each diode is equal to $V_r$ irrespective of the values of the voltages $v_a$, $v_b$, $v_c$ and $v_d$. The value of $V_r$ at which the transmission from the demodulator has the maximum quadradic value is determined experimentally and appears to be about equal to the threshold voltage of the diodes.

Figure 3:
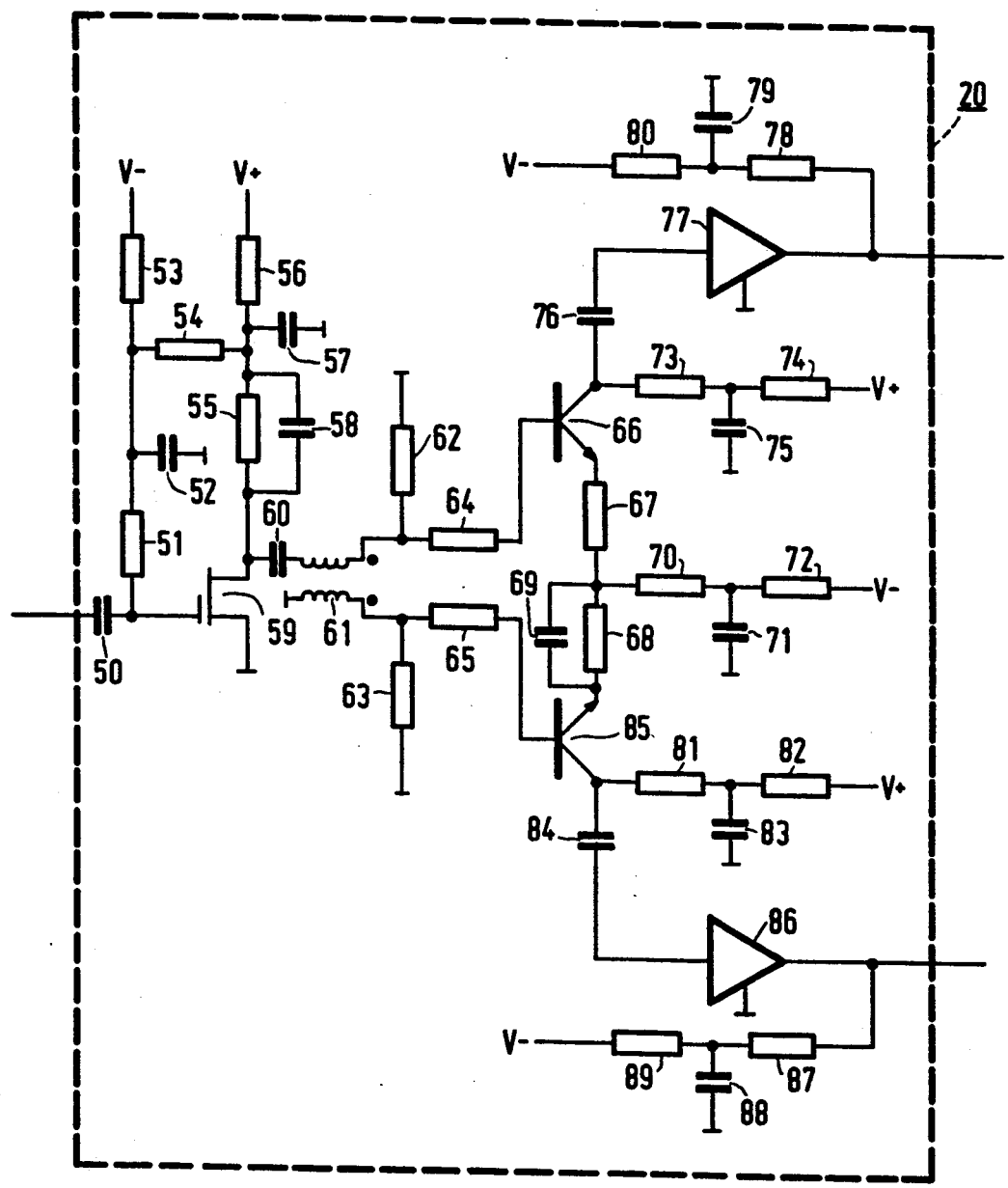
FIG. 3 shows a balanced amplifier having two output signals with equal amplitude and opposite phases to be used in a demodulator as shown in FIG. 2.

In the balanced amplifier as shown in FIG. 3, the input signal is applied to a first side of a capacitor 50. A second side of the capacitor 50 is connected to the gate of a field effect transistor 59 and to a first side of a resistor 51. A second side of the resistor 51 is connected to a first side of a capacitor 52, a first side of a resistor 53 and a first side of a resistor 54. A second side of the capacitor 52 is connected to earth, whereas a second side of the resistor 53 is connected to a negative supply voltage $V_-$. The source of the field effect transistor 59 is connected to earth. The drain of the field effect transistor 59 is connected to a first side of a capacitor 60, a first side of a resistor 55 and a first side of a capacitor 58. A second side of the resistor 55 is connected to a second side of the capacitor 58, a second capacitor 57 and a first side of a resistor 56. A second side of the resistor 56 is connected to a positive supply voltage $V_+$ and a second side of the capacitor 57 is connected to earth.

A second side of the capacitor 60 is connected to a first side of a first winding of a transformer 61. A second side of the first winding of the transformer 61 is connected to a first side of a resistor 62 and a first side of a resistor 64. A second side of the resistor 62 is connected to earth. A second side of the resistor 64 is connected to the base of an NPN transistor 66.

The emitter of the transistor 66 is connected to a first side of a resistor 67, whereas a second side of the resistor 67 is connected to a first side of a resistor 70. The collector of the transistor 66 is connected to a first side of a resistor 73 and a first side of a capacitor 76. A second side of the resistor 73 is connected to a first side of a resistor 74 and a first side of a capacitor 75. A second side of the capacitor 75 is connected to earth, whereas a second side of the resistor 74 is connected to the positive supply voltage $V_+$. A second side of the capacitor 76 is connected to the input of an amplifier module 77. A feeding point of the amplifier module 77 is connected to earth. The output of the amplifier module 77 forms one of the outputs of the amplifier 20. This output is also connected to a first side of a resistor 78. A second side of the resistor 78 is connected to a first side of a resistor 80 and to a first side of a capacitor 79. A second side of the capacitor 79 is connected to earth. A second side of the resistor 80 is connected to the negative supply voltage $V_-$.

A first side of a second winding of the transformer 61 is connected to earth. A second side of the second winding of the transformer 61 is connected to a first side of a resistor 63 and a first side of a resistor 65. A second side of the resistor 63 is connected to earth. A second side of the resistor 65 is connected to the base of an NPN transistor 85.

The emitter of the transistor 85 is connected to a first side of a resistor 68, whereas a second side of the resistor 68 is connected to a first side of the resistor 70. A capacitor 69 is connected in parallel to the resistor 68. The collector of the transistor 85 is connected to a first side of a resistor 81 and a first side of a capacitor 84. A second side of the resistor 81 is connected to a first side of a resistor 82 and a first side of a capacitor 83. A second side of the capacitor 83 is connected to earth, whereas a second side of the resistor 82 is connected to the positive supply voltage $V_+$. A second side of the capacitor 84 is connected to the input of an amplifier module 86. A feeding point of the amplifier module 86 is connected to earth. The output of the amplifier module 86 forms one of the outputs of the amplifier 20. This output is also connected to a first side of a resistor 87. A second side of the resistor 87 is connected to a first side of a resistor 89 and a first side of a capacitor 88. A second side of the capacitor 88 is connected to earth. A second side of the resistor 89 is connected to the negative supply voltage $V_-$.

A second side of the resistor 70 is connected to a first side of a capacitor 71 and to a first side of a resistor 72. A second side of the capacitor 71 is connected to earth, whereas a second side of the resistor 72 is connected to the negative supply voltage $V_-$.

The field effect transistor 59 together with the resistor 55 and the capacitor 58 form a common source amplifier. The quiescent current adjustment of the transistor 59 is obtained by means of a negative feedback network for a DC voltage formed by the resistors 53, 54, 55 and 56. The capacitor 57 short-circuits the junction between the resistors 54, 55 and 56 to earth so that noise signals at the feeding point do not affect the voltage on said junction. Because the capacitor 52 for the intermediate-frequency signals has a low impedance, the input impedance of the amplifier may be determined by means of resistor 51 without this having any effect on the transfer function of the amplifier. The gain factor of this common source amplifier is determined by the value of the quiescent current in the transistor 59 and the value of the impedance formed by the parallel connection of the resistor 55, the capacitor 58 and the input impedance of the transformer 61. The impedance of the capacitor 60 is so low that the capacitor 60 does not have any effect on the transfer function.

As the transformer 61 has a winding ratio equal to one, the currents in the two windings, according to a known transformer property, will have equal magnitude and opposite phases. If the load impedances for the two windings are equal, the voltages across the load impedances will be equally large and have opposite phases. These load impedances are formed by the mutually identical resistors 62 and 63.

The transistors 66 and 85 form an emitter-degenerated differential amplifier with negative feedback resistors 67 and 68 and load resistors 73 and 81. The resistors 70 and 72 determine the quiescent current of the transistors 66 and 85. The capacitor 71 avoids noise signals at the feeding points being transferred to the transistors 66 and 85. The capacitor 69 compensates the effect the asymmetry of transformer 61 has on the transfer function of the amplifier, so that the output signals still remain symmetrical. The resistors 64 and 65 are inserted to avoid self-excited oscillation of the differential amplifier. The collector DC voltages of the transistors 66 and 85 respectively, are determined by the resistors 73 and 74 and 81 and 82 respectively. The capacitors 75 and 83 avoid noise signals from the feeding points arriving at the collectors of the transistors.

The two output signals of the differential amplifier are applied to the amplifier modules 77 and 86 through the capacitors 76 and 84. The amplifier modules 77 and 86 respectively, are fed with a quiescent current by the resistors 78 and 80 and 87 and 89 respectively. The capacitors 79 and 88 avoid noise signal crosstalk flowing from the feeding points to the outputs of the amplifier modules 77 and 86. The desired output signals of the amplifier 20 are available at the outputs of the amplifier modules 77 and 86.

Figure 4:
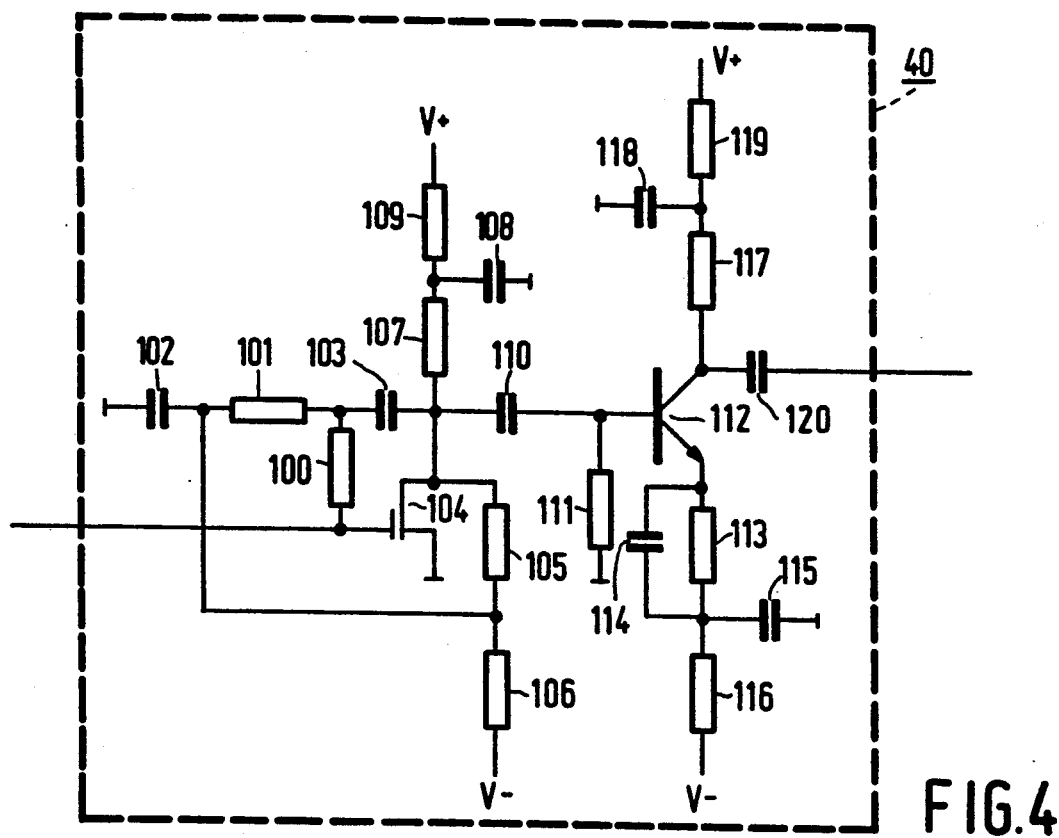
FIG. 4 shows a current-to-voltage converter to be used in a demodulator as shown in FIG. 2.

In the current-to-voltage converter as shown in FIG. 4 the input is connected to the gate of a field effect transistor 104 and to a first side of a resistor 100. A second side of the resistor 100 is connected to a first side of a resistor 101 and a first side of a capacitor 103. The source of the transistor 104 is connected to earth. A second side of the resistor 101 is connected to a first side of a capacitor 102 and first sides of the resistors 105 and 106. A second side of the capacitor 102 is connected to earth. A second side of the resistor 106 is connected to the negative supply voltage. A second side of the resistor 105 is connected to the drain of the transistor 104 which is also connected to a first side of a capacitor 110, a second side of a capacitor 103 and a first of a resistor 107. A second side of the resistor 107 is connected to a first side of a capacitor 108 and a first side of a resistor 109. A second side of the capacitor 108 is connected to earth. A second side of the resistor 109 is connected to the positive supply voltage $V_+$. A second side of the capacitor 110 is connected to the base of an NPN transistor 112 and a first side of a resistor 111. A second side of the resistor 111 is connected to earth. The emitter of the transistor 112 is connected to a first side of a resistor 113 and a first side of a capacitor 114. A second side of the resistor 113 is connected to a second side of the capacitor 114, a first side of a capacitor 115 and a first side of a resistor 116. A second side of the capacitor 115 is connected to earth, whereas a second side of the resistor 116 is connected to the negative supply voltage.

The collector of the transistor 112 is connected to a first side of a capacitor 120 and a first side of a resistor 117. A second side of the resistor 117 is connected to a first side of a capacitor 118 and a first side of a resistor 119. A second side of the resistor 119 is connected to the positive supply voltage, whereas a second side of the capacitor 118 is connected to earth. A second side of the capacitor 120 forms the output of the current-to-voltage converter.

The current-to-voltage converter is constituted by a common source amplifier formed with the aid of a field effect transistor 104 and which amplifier has a negative feedback to the resistor 110 which for high frequencies is inserted between the drain and source of the transistor 104. According to a known property of a negative feedback amplifier, this amplifier will reduce its input voltage to a small value. Consequently, the output signal of the current-to-voltage converter is substantially equal to the product of the current applied to the input and the resistance of the negative feedback resistor 100. The value of this resistor is selected to be so great (390 $\Omega$), that the noise contribution of the current-to-voltage converter is smaller than the noise contributions of the diodes 27, 28, 36 and 37 shown in FIG. 2, but so great that the bandwidth of the current-to-voltage converter remains sufficient. The resistors 105, 106 and 107 determine the quiescent current of the transistor means 104 by means of DC negative feedback. The capacitor 103 avoids the source and drain of the transistor 104 being DC short-circuited through resistor 100. The capacitors 102 and 108 avoid crosstalk of noise signals which are present on the supply voltages to the output of the current-to-voltage converter.

The current-to-voltage converter proper is followed by a buffer amplifier realised by means of a transistor 112. The quiescent current adjustment of the transistor 112 is determined by the resistors 111, 113 and 116. The collector DC voltage is determined by the resistors 117 and 119. The capacitors 115 and 118 are used for cancelling noise signals coming from the supply voltage. The output signal of the whole current-to-voltage converter is tapped across capacitor 120.

Figure 5:
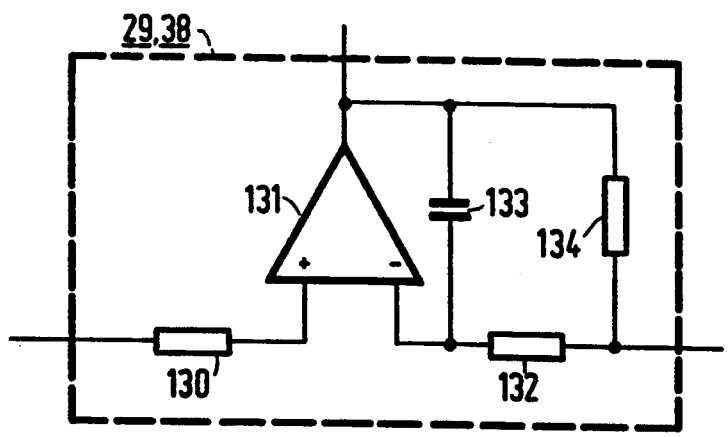
FIG. 5 shows an embodiment of coupling means arranged as a low-pass filter to be used in a demodulator as shown in FIG. 2.

In the low-pass filter as shown in FIG. 5 the input is formed by a first side of a resistor 130. A second side of the resistor 130 is connected to the non-inverting input of an operational amplifier 131. The inverting input of the operational amplifier 131 is connected to a first side of a resistor 132 and to a first side of a capacitor 133. The output of the operational amplifier 131 is connected to a second side of the capacitor 133 and a first side of a resistor 134. A second side of the resistor 132 and a second side of the resistor 143 are interconnected and together form the output of the low-pass filter.

Due to the known property of a negative feedback operational amplifier, the operational amplifier 131 will cause the DC voltage between its inputs to be substantially equal to 0. Because the values of the resistors 130 and 132 are low relative to the input impedance of the operational amplifier 131, there will hardly be any DC voltage across the resistors 130 and 132. Consequently, the input and output voltages of the low-pass filter are equal as regards the DC voltage. Because the transfer function of the operational amplifier 131 becomes substantially zero for high frequencies, and because the capacitor 133 forms a short-circuit for high frequencies, the output voltage of the low-pass filter is equal to 0 for high frequencies. A voltage proportional to the output current supplied by the low-pass filter is available across the resistor 134. This signal is used in low-pass filter 41 (FIG. 2) for producing an additional output signal. In the low-pass filters 29 and 38 (FIG. 2) this additional output signal is not used. The resistors 132 and 134 also provide that the input and output of the low-pass filter, irrespective of the properties of the operational amplifier, form a relatively high input impedance (several kΩ) for high frequencies, so that the low-pass filters do not affect the intermediate-frequency signal. The capacitor 133 is present for avoiding undesired oscillation of the low-pass filter.

Figure 6:
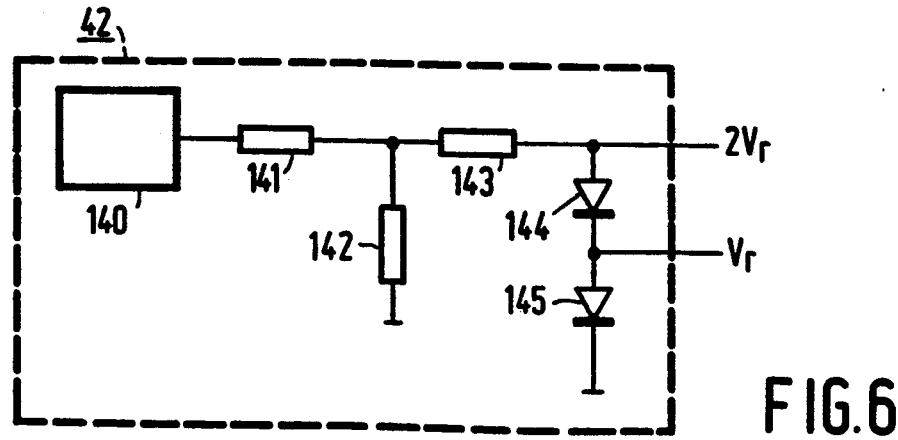
FIG. 6 shows a reference circuit for generating reference voltages $V_r$ and $2 V_r$ to be used in a demodulator as shown in FIG. 2.

In the reference circuit shown in FIG. 6 the output of an integrated voltage control circuit 140 is connected to a first side of a resistor 141. A second side of the resistor 141 is connected to a first side of a resistor 142 and a first side of a resistor 143. A second side of the resistor 142 is connected to earth. A second side of the resistor 143 is connected to the anode of a diode 144, which diode 144 forms a first reference element. The cathode of the diode 144 is connected to the anode of a diode 145, which diode 145 forms a second reference element. The cathode of the diode 145 is connected to earth. The voltage 2 $V_r$ is available on the anode of diode 144 and the voltage $V_r$ is available on the anode of the diode 145.

The resistors 141, 142 and 143 convert the voltage of the voltage control circuit into a current suitable for the diodes ($\approx$100 µA). In addition, they provide that the current source has an output impedance adapted to the diodes because experiments have shown that there is a value of the output impedance of the current source at which there is a minimum effect of temperature variations on the accuracy of the quadratic relation between input and output signal of the demodulator.

In the following Table the most important values and types of components are given for a demodulator suitable for receiving an FSK signal at a transmission rate of 140 Mbit/sec., while the intermediate frequency of the receiver is 1.3 GHz.

| Reference | Type of component | type or value |
|---|---|---|
| 23 | short-circuited stub | 17 mm 50 Ω stripline |
| 26 | open stub | 17 mm 50 Ω stripline |
| 27 | diode | ND4131-3-G, NEC make |
| 28 | diode | ND4131-3-G, NEC make |
| 32 | open stub | 17 mm 50 Ω stripline |
| 35 | short-circuited stub | 17 mm 50 Ω stirpline |
| 36 | diode | ND4131-3-G, NEC make |
| 37 | diode | ND4131-3-G, NEC make |
| 59 | MOSFET | NE720, NEC make |
| 61 | transformer | 15 mm 50 Ω twin coax |
| 66 | NPN transistor | BFQ66, Philips make |
| 67 | amplifier module | MSA 0485, Avantek make |
| 85 | NPN transistor | BFQ66, Philips make |
| 86 | amplifier module | MSA 0485, Avantek make |
| 104 | MOSFET | NE720, NEC make |
| 112 | NPN transistor | BFQ66, Philips make |
| 131 | op amp | OP27, PMI make |
| 140 | voltage control circuit | REF03 (2.5 volts,) PMI make |
| 144 | diode | ND4131-3-G, NEC make |
| 144 | diode | ND4131-3-G, NEC make |

We claim:

1. Receiver for polarization-diversity reception with a square-law recombining of baseband signals comprising two intermediate-frequency branches formed each by a demodulator having an input, characterized in that each demodulator comprises a balanced circuit having first and second outputs with equal-amplitude and different-sign output signals, which output signals are derived from the input signal of the demodulator concerned, in that each demodulator comprises at least first and second non-linear elements which have an input and an output and a mutually equal relation between input signal and output signal, in that the first output of each balanced circuit is connected to the input of the associated first non-linear element, in that the second output of each balanced circuit is connected to the associated second non-linear element and in that the receiver comprising summing means for determining the sum of the output signals of the non-linear elements in the two demodulators.

2. Receiver as claimed in claim 1, characterized in that the output signals of the first and second outputs of each balanced circuit are derived from the input signal of the demodulator concerned with the aid of a low-pass filter, in that each balanced circuit has third and fourth ouputs with equal-amplitude and different-sign output signals which ouput signals are derived from the output signal of the demodulator concerned with the aid of a high-pass filter, in that each demodulator comprises third and fourth non-linear elements having an input and an output and a mutually identical relation between input signal and output signal, in that the third output of each balanced circuit is connected to the input of the associated third non-linear element, in that the fourth output of each balanced circuit is connected to the input of the associated fourth non-linear element and in that the sign of the output signal of each first and second non-linear element differs from the signs of the output signals of the associated third and fourth non-linear elements and in that the output of each third and fourth non-linear element are connected to the summing means.

3. Receiver as claimed in claim 2, characterized in that the low-pass filter and the high-pass filter comprise an open or a short-circuited transmission line.

4. Receiver as claimed in claim 1, characterized in that the input signals of the non-linear elements are formed by the voltage across the non-linear elements and in that the output signals of the non-linear elements are formed by the current through the non-linear elements.

5. Receiver as claimed in claim 4, characterized in that the receiver comprises a current source connected on one side to a first side of a first reference element, in that the second side of the first reference element is connected to a first side of a second reference element and in that a second side of the second reference element is connected to the second side of the current source, in that the receiver comprises separate coupling means for each first and second non-linear element which coupling means are used for transferring the DC voltage from the first side of the first reference element to the input of each first non-linear element and to the input of each second non-linear element, in that the receiver comprises separate coupling means for each third and fourth non-linear element which coupling means are used for transferring the DC voltage from the second side of the second reference element to the input of each third non-linear element and to the input of each fourth non-linear element and in that the receiver comprises separate coupling means for transferring the DC voltage from the second side of the first reference element to the inputs of the summing means.

6. Receiver as claimed in claim 5, characterized in that the reference elements and the non-linear elements are mutually identical.

7. Receiver as claimed in one of the claim 1, characterized in that the non-linear elements comprise a diode.

8. Receiver as claimed in claim 2, characterized in that the input signals of the non-linear elements are formed by the voltage across the non-linear elements and in that the output signals of the non-linear elements are formed by the current through the non-linear elements.

9. Receiver as claimed in claim 3, characterized in that the input signals of the non-linear elements are formed by the voltage across the non-linear elements and in that the output signals of the non-linear elements are formed by the current through the non-linear elements.

10. Receiver as claimed in claim 8, characterized in that the receiver comprises a current source connected on one side to a first side of a first reference element, in that the second side of the first reference element is connected to a first side of a second reference element and in that a second side of the second reference element is connected to the second side of the current source, in that the receiver comprises separate coupling means for each first and second non-linear element which coupling means are used for transferring the DC voltage from the first side of the first reference element to the input of each first non-linear element and to the input of each second non-linear element, in that the receiver comprises separate coupling means for each third and fourth non-linear element which coupling means are used for transferring the DC voltage from the second side of the second reference element to the input of each third non-linear element and to the input of each fourth non-linear element and in that the receiver comprises separate coupling means for transferring the DC voltage from the second side of the first reference element to the inputs of the summing means.

11. Receiver as claimed in claim 9, characterized in that the receiver comprises a current source connected on one side to a first side of a first reference element, in that the second side of the first reference element is connected to a first side of a second reference element and in that a second side of the second reference element is connected to the second side of the current source, in that the receiver comprises separate coupling means for each first and second non-linear element which coupling means are used for transferring the DC voltage from the first side of the first reference element to the input of each first non-linear element and to the input of each second non-linear element, in that the receiver comprises separate coupling means for each third and fourth non-linear element which coupling means are used for transferring the DC voltage from the second side of the second reference element to the input of each third non-linear element and to the input of each fourth non-linear element and in that the receiver comprises separate coupling means for transferring the DC voltage from the second side of the first reference element to the inputs of the summing means.

12. Receiver as claimed in claim 10, characterized in that the reference elements and the non-linear elements are mutually identical.

13. Receiver as claimed in claim 11, characterized in that the reference elements and the non-linear elements are mutually identical.

* * * * *